July 31, 1962　　C. D. MACY ETAL　　3,046,597
MACHINE FOR REMOVING HIDES FROM SLAUGHTER
ANIMALS AND THE LIKE
Filed May 28, 1959　　　　　　　　　　　　　3 Sheets-Sheet 2
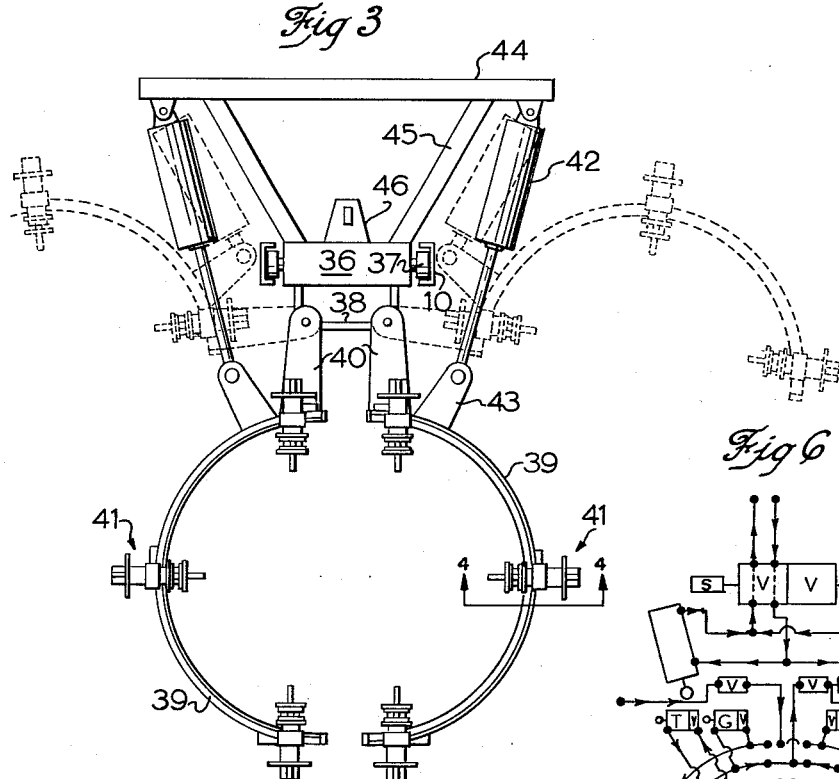
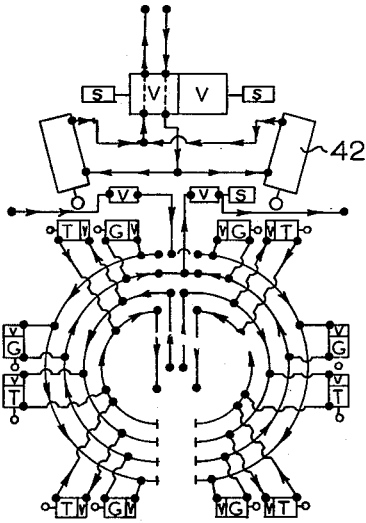
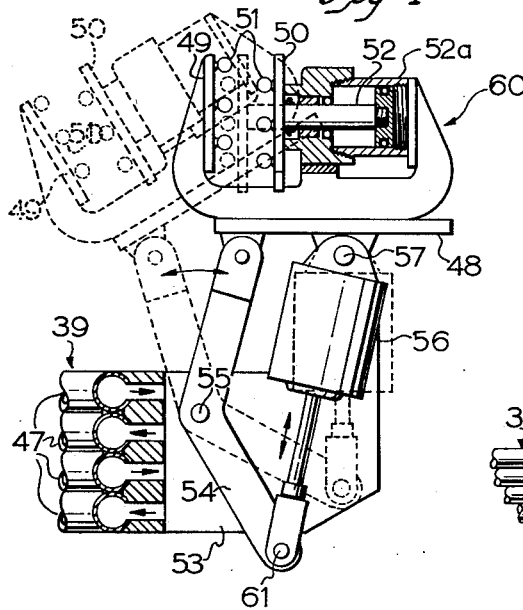
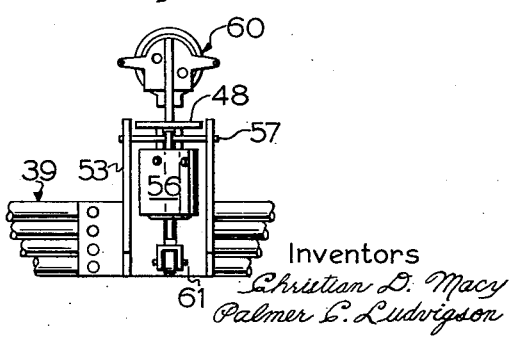
Inventors
Christian D. Macy
Palmer L. Ludvigson
By Their Attorneys
Williamson, Schroeder & Palmatier July 31, 1962   C. D. MACY ETAL   3,046,597
MACHINE FOR REMOVING HIDES FROM SLAUGHTER
ANIMALS AND THE LIKE
Filed May 28, 1959   3 Sheets-Sheet 3
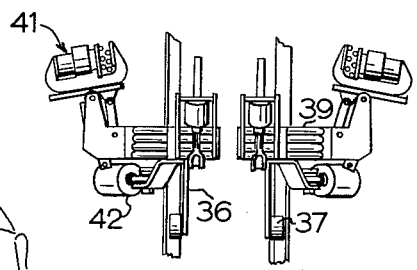
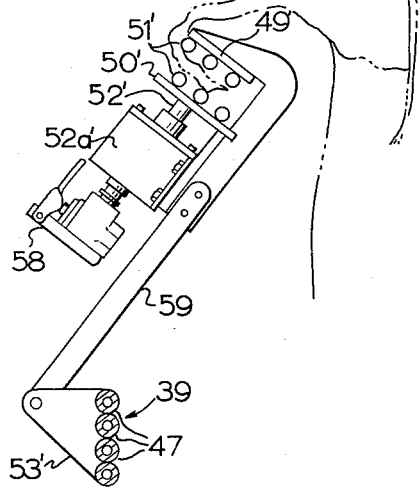
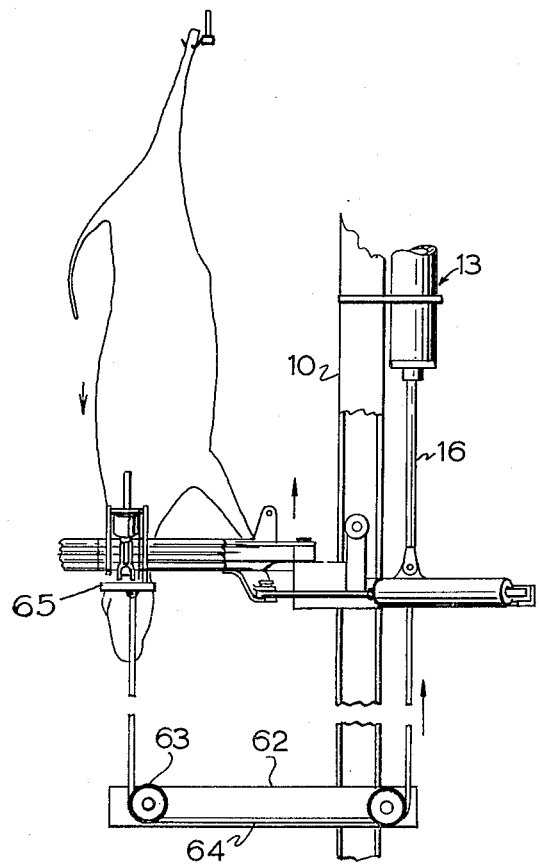
Inventors
Christian D. Macy
Palmer C. Ludvigson
By Their Attorneys
Williamson, Schroeder & Palmatier

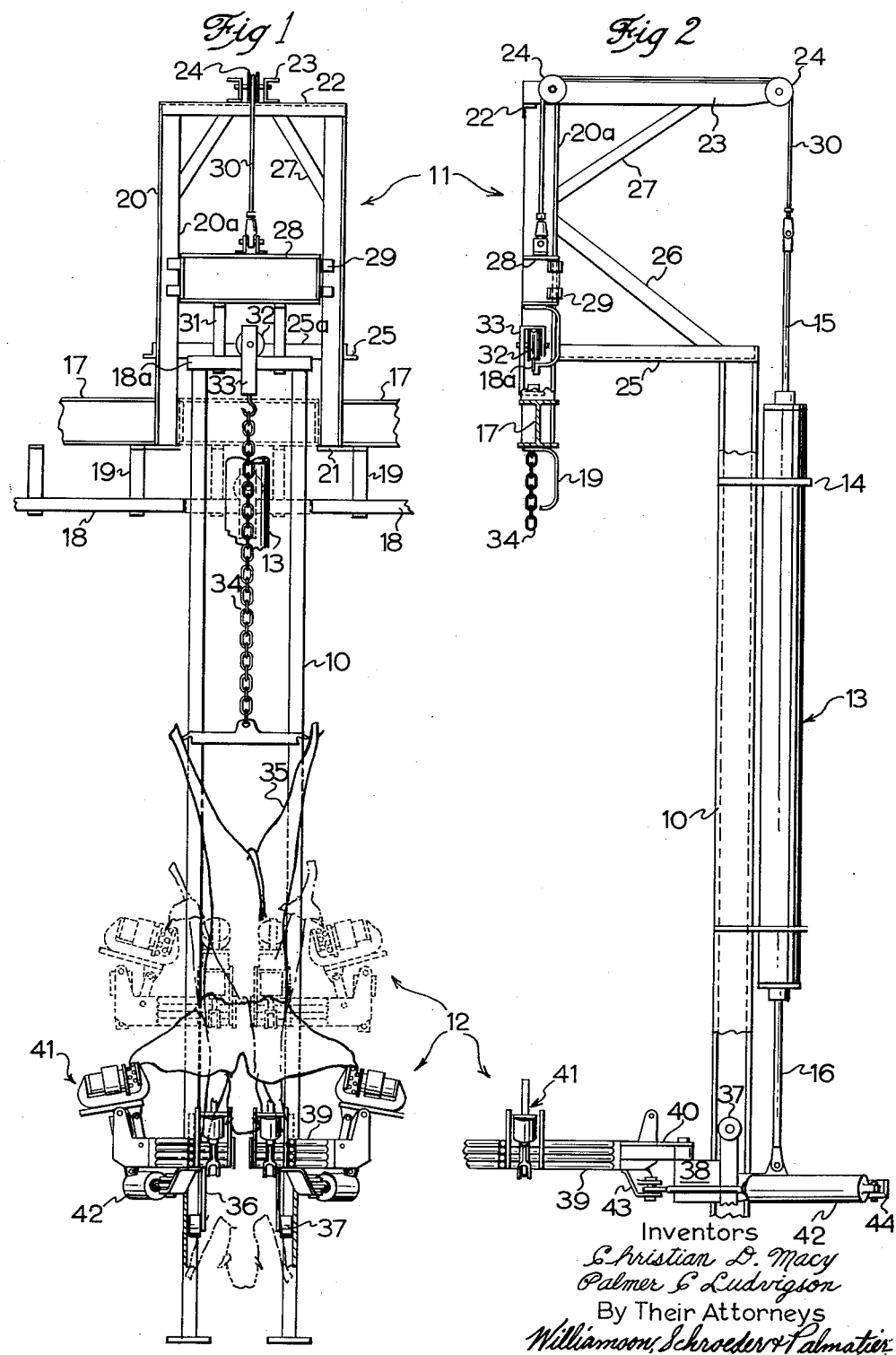

United States Patent Office 3,046,597
Patented July 31, 1962

3,046,597
MACHINE FOR REMOVING HIDES FROM SLAUGHTER ANIMALS AND THE LIKE
Christian D. Macy and Palmer C. Ludvigson, Austin, Minn., assignors to Geo. A. Hormel & Co., Austin, Minn., a corporation of Delaware
Filed May 28, 1959, Ser. No. 816,439
6 Claims. (Cl. 17—21)

This invention relates to the removal of substantially whole hides from large animals such as are commonly slaughtered and butchered in packing plants.

It is an object of our present invention to provide novel and substantially improved methods and apparatus or machine for quickly and efficiently removing substantially the entire hides from large slaughter animals and the like requiring a minimum of highly skilled labor on the part of the operator and adapted to operate quickly and accurately on the production line of the plant.

Heretofore, in packing plants and slaughter houses the removal of the hide of the larger animals such as cattle and sheep, has required high skill of usually two or more operators, with rotary cutting knives to cut and strip the hides successively away from the flesh of the carcasses. Some machines are now utilized for circumferentially pulling portions of the hides away from the carcasses after substantial preliminary cutting of the hide and stripping of the hide from the flesh has been effected by skilled operators. Some of the presently used apparatus for removing hides requires movable carriages automatically controlled for height and horizontal movement by skilled operators with clamping devices which may engage the longitudinally freed portions from the hides and then impart pull circumferentially of the animal. Such last mentioned apparatus and machines require a very large amount of space and are extremely expensive even for the larger packing plants and again, highly skilled operators are needed to do a large amount of personalized stripping and cutting of hides from flesh, to accomplish the purposes.

More specifically it is an object of our invention to provide a machine and a novel method of quickly and accurately removing substantially integrally, the hides from larger animals such as those slaughtered in packing plants and whereby a very minimum of manual cutting and stripping is required, our method employing the rapid pulling off of the greater portion of the hide in tubular form in the manner of removal of a sweater, longitudinally of the torso of the animal.

A further object is the provision of an improved and novel machine which may be utilized for animals varying considerably in weight and length and whereby substantially the entire hide may be stripped in tubular fashion from the carcass in one operation after application of a series of gripping devices, along the edges of a substantially annular exposed cut made adjacent one end of the slaughter animal.

A still further object is the provision of an improved method whereby the labor may be minimized in the removal of a hide and the time element required therefor and wherein a minimum amount of space is required for installation and operation of our machine and the method disclosed herein.

These and other objects and advantages of our invention will more fully appear from the following description made in connection with the accompanying drawings wherein like reference characters refer to the same or similar parts throughout the several views, and in which:

FIG. 1 is a front elevational view with portions broken away showing the apparatus of our invention with an animal suspended therefrom in hide removing position;

FIG. 2 is a right side elevational view with broken away portions;

FIG. 3 is a top plan view on an enlarged scale of the hide engaging and stripping assembly;

FIG. 4 is a sectional view of the hide engaging and stripping assembly taken along the line 4—4 of FIG. 3 showing a tensionable gripping unit in partial section;

FIG. 5 is a rear elevational view on a reduced scale of the gripper assembly shown in FIG. 4;

FIG. 6 is a schematic plan or flow diagram of the pneumatic system employed to operate the hide stripping assembly;

FIG. 7 is a detailed elevational view of a non-tensioned gripping unit which may be employed in the apparatus of our invention;

FIG. 8 is a fragmentary front elevational view of the hide stripping assembly; and FIG. 9 is a fragmentary side elevational view of an alternate form of our invention.

Referring to the drawings which illustrate preferred embodiments of our invention, and particularly to FIGS. 1 and 2, the apparatus of our invention includes a pair of elongate vertical spaced apart rigid main supporting members or standards 10 which aid in supporting an animal elevating mechanism for raising and lowering a suspended slaughter animal indicated generally by the numeral 11, and upon which are mounted a reciprocating hide stripping assembly, indicated generally by the numeral 12, and a main double action hydraulic cylinder or motor 13 adapted to move said elevating mechanism and stripping assembly simultaneously in opposite directions.

The inner diametrically opposed faces of the standards 10 are provided with longitudinal channels which serve as tracks or ways for the guided up and down movement of the hide stripping assembly 12 hereinafter to be described.

The double action hydraulic motor 13 is mounted in vertical fashion, behind and between the pair of standards 10 by suitable supporting or mounting means such as the brackets 14 carried by the standards 10.

The hydraulic motor 13 includes a conventional piston element (not shown) enclosed within the cylinder which has connected thereto and simultaneously motivated thereby an upper connecting rod 15 which is interconnected with the elevating mechanism, and a lower connecting rod 16 interconnected with the hide stripping assembly, the rods 15 and 16 being adapted for simultaneous up and down movement in the same direction corresponding to the direction of movement of the piston element with which they are cooperatively engaged. The hydraulic motor is also provided with suitable fluid lines and operating controls (not shown) which may be of any well known type, and which have been eliminated from the drawings for purposes of clarity.

A pair of strong rigid elongate longitudinally aligned spaced apart elevated horizontally disposed supporting members such as the I-beams 17 are provided in front of the standards 10 and parallel to a vertical plane common to said standards. These I-beams 17 together with the standards 10 combine to support the animal elevating mechanism hereinafter to be described. The I-beams 17 also serve as the supporting structure for a thin rigid interrupted elongate horizontal track member or transport rail 18 having a removable elevating rail section 18a, the upper edge of which provides a track for the guided movement of the animal suspending unit (hereinafter to be described) along a dressing line to deliver the undressed animal to the hide stripping apparatus of our invention and remove the carcass therefrom after the hide has been removed. The rail 18 is suspended from the I-beams 17 by a plurality of depending C-brackets 19.

The immediate elevating mechanism supporting structure includes an inverted U-shaped frame consisting of a pair of upstanding vertical supporting members or T-rails 20 which are supported by and rigidly secured to the opposed ends of the I-beams 17 and define an elevating mechanism receiving opening therebetween. Abutments or stop members such as the horizontally disposed plates 21 are affixed to the feet of each of the T-rails and are adapted to abut with the elevating mechanism to limit the downward displacement or movement thereof. The main stems or legs 20a of each of the T-rails 20 project inwardly towards one another in diametrically opposed aligned relationship and provide a track for the guided up and down movement of the elevating mechanism which is slidably engaged therewith.

The T-rails 20 are reinforced at the top by a spacing member 22, said spacing member 22 having mounted thereon a pair of horizontal rearwardly extending pulley supporting channels 23 which support therebetween a pair of pulleys 24 disposed forwardly and rearwardly of said channels. Horizontal bracing members 25 extend between the T-rails 20 carried by the I-beams and a transverse supporting brace 25a mounted atop the main supporting standards 10 to further support the elevating mechanism supporting structure. Diagonal cross bracing members 26 and 27 are provided between said bracing 25 and T-rails 20 and between the T-rails and pulley channels 23 respectively to lend additional support to the elevating mechanism supporting structure.

The animal elevating mechanism comprises a rectangular elevator frame 28 disposed between and slidably engaged with the upstanding T-rail 20, said frame 28 having a pair of bifurcated guide members 29 extending laterally from each side thereof which fit over the track legs 20a of the T-rails 20 and slidably engage the same to permit the entire elevator frame 28 to slide freely up and down thereon in guided fashion. This elevator frame 28 is interconnected with the upper connecting rod 15 of the hydraulic motor 13 by means of a cable or wire rope 30 trained over the pulleys 24.

The elevator frame 28 carries and has depending therefrom a pair of vertical horizontally spaced elevating rail section supporting members such as the C-bracket 31 which in turn have mounted thereon at their lower extremities the horizontally disposed removable elevating rail section 18a corresponding to the transport rails 18 and having a suitable knife edge or track on the upper surface thereof which supports the animal suspending unit.

The animal suspending unit includes a peripherally grooved guide roller 32 pivotally mounted on a hooked hanger member 33, said roller riding on the elevating rail section 18a when in operation. The hanger has suspended therefrom a chain 34 which in turn supports a mounting bar 35 from which the animal is suspended, preferably by the hind quarters thereof and preferably with the back of the animal facing outwardly or towards the operator. It should be noted that the elevating structure is so designed that when the frame 28 comes to a rest or stop position on the abutment plates 21, the elevating rail section 18a is in direct alignment with the transport rail 18, with the adjacent ends of said rails 18 and 18a in contiguous relation to one another to permit the guide roller 32 to pass directly from one to the other, and assumes the position indicated by the dotted lines of FIG. 1.

The hide stripping assembly 12 is movably mounted on the main supporting standards 10 beneath the animal supporting and elevating mechanism. The hide stripping assembly is provided with a basic supporting structure 36 and is movably disposed between the main supporting standards 10, said basic supporting structure carrying on each side thereof a pair of wheels 37 which are disposed within the recesses or channels provided by the main supporting standards 10 and are vertically movable up and down in relation thereto. The basic supporting structure 26 carries forwardly thereof a rectangular frame 38 which pivotally supports a pair of horizontally disposed diametrically opposed semi-circular animal enclosing half-ring yoke members or stretcher arms 39 by means of suitable pivotally mounted mounting brackets 40. These arms 39 are adapted to be swung inwardly towards the carcass to assume the closed position shown by the solid lines and outwardly away from the carcass to assume the open out-of-the-way position shown by the dotted lines of FIG. 3, the arms preferably opening sufficiently to permit the suspended animal carcass to pass by them. Each of said arms carry, in the form shown, three hide gripping units, indicated generally by 41, and disposed at spaced intervals on the arms and to be described in more detail hereafter. Although we preferably employ three gripping units on each arm, it is to be understood that the number of gripping units may vary so long as the hide is gripped circumferentially at a sufficient number of points to permit substantially uniform removal of the hide from the carcass.

The arms 39 are opened and closed by means of reciprocating piston and cylinder units 42 which are preferably pneumatically operated and pivotally connected at their forward ends to suitable bracket members 43 carried by the arms 39 and are pivotally mounted rearwardly on an elongated horizontal supporting member 44 which in turn is supported by and mounted on the basic hide supporting structure 36 by means of a pair of diagonal braces 45. The basic supporting structure 36 has extending rearwardly therefrom and securely affixed thereto intermediate the diagonal braces 45 a connecting rod engaging bracket 46 which is connected by suitable means to the downwardly extending lower connecting rod 16 of the main hydraulic motor 13 to cause the hide gripping assembly to be moved up and down thereby.

The hide gripping units 41 are best shown in FIGS. 4 and 5. The actual hide gripping mechanism indicated generally by 60 is mounted on a jaw supporting plate 48 and includes a fixed jaw member and a movable jaw member mounted in direct opposition to said fixed jaw member, said jaw members consisting preferably of circular disks 49 and 50 respectively, said disks each carrying a plurality of elongate horizontally disposed vertically spaced gripping rods 51, the rods carried by one jaw being in staggered relationship with the gripping rods of the opposing jaw member so as to pass therebetween. Thus, when the hide is inserted between the jaw members and the jaw members are closed, the hide thereby becomes gripped in a tortuous fashion so as to provide a secure gripping relationship with a minimum of damage to the hide. The movable jaw member is motivated by a suitable preferably pneumatically operated reciprocating piston 52 carried rearwardly thereof and enclosed by a suitable housing 52a and operated by a suitable pneumatic system not shown. The jaw supporting plate 48 is in turn pivotally mounted on a radially extending bifurcated mounting bracket 53 carried by the arm 39 by means of a dog leg member 54 which is pivotally attached to the mounting bracket 53 as by the pivot pin 55.

The gripping mechanism is adapted to be tilted inwardly for ease in initially grasping the hide and outwardly to provide tension on the hide and stretch the same to pull the same away from the carcass, by means of a preferably pneumatically operated tensioning piston and cylinder 56 carried by each gripping assembly, the cylinder being pivotally mounted at its upper end on, and intermediate of, the upstanding ears of the bifurcated mounting bracket 53 by a mounting pin 57 and the piston being pivotally connected at its lower end to the lower extremity of the dog leg 54 as by means of pivot pin 61. Thus, when the piston is drawn upwardly, the entire gripping mechanism is tilted inwardly to assume the dotted position of FIG. 4 and when the piston is extended downwardly, the gripping mechanism is moved outwardly to assume the position of the solid lines of FIG. 4.

In the form shown, the arms 39 consist of four tiers of independent air passageways or manifolds 47 fastened together by a suitable means such as welding or the like so as to function as a unit to operate as stretcher arms 39, and function independently as common passageways for the delivery and return or exhaust of air to the pneumatically operated hide gripping units.

The tensioning piston and cylinders 56 and the movable jaw pistons 52 are each suitably connected with an air delivery and return passageway 47 in the arms 39 by suitable tubing or hoses (not shown) and operated by suitable control valves (also not shown).

To make the drawings easier to understand, the hose connections and couplings required to operate the various pneumatically operated parts of this hide gripping assembly 12 have been dispensed with and the entire diagram therefor is shown in FIG. 6. Thus, the semi-circular arms 39 in the form shown carry or provide two air return passageways and two air delivery passageways. As may be seen from the schematic diagram of FIG. 6, each of the hide gripping assemblies is pneumatically connected in suitable fashion with these passageways so that each movable jaw piston 52 connects with an air return and an air delivery passageway and each pneumatic tensioning piston and cylinder 56 taps into the other or remaining air return and delivery manifolds carried by the same circular arm. In FIG. 6, the tensioning piston and cylinders 56 are represented by T, the movable jaw units by G, the valves V, and the solenoids which control certain of the valves by S.

The alternative form of gripper mechanism shown in FIG. 7 is basically the same as that shown in FIGS. 3 and 4 and previously described, except that the tensioning cylinder 56 is dispensed with and the entire gripping assembly is pivoted for free movement on the semi-circular arms 39 and is so adapted as to tend to trace the exterior or periphery of the carcass as the hide H is being pulled away therefrom.

The non-tensioned gripper mechanism of FIG. 7 has a fixed and movable jaw member including disks 49' and 50' respectively, and gripping rods 51' corresponding to those previously described, the movable jaw being motivated by a pneumatic piston 52' enclosed in a suitable housing 52a' and having a suitable valve control 58 therefor. The jaws, pistons, piston housing and controls therefor are mounted on an elongate arm or handle 59 which is pivotally mounted at its lower end to a mounting bracket 53' extending radially from and carried by the stretcher arm 39, the entire gripper assembly being disposed to lean or fall inwardly towards the animal with the jaw opening facing generally upwardly. It is obvious that when this form of gripping unit is employed, two of the air manifolds or passageways 47 (one exhaust and one delivery) may be eliminated or dispensed with since there is no pneumatic tensioning piston and cylinder and only a pair of manifolds are necessary for the operation of the movable jaw piston 52'.

In operation and use, the unskinned carcass of the animal is suspended by its hind quarters from the animal suspending mechanism which is initially mounted for travel on the transport rail 18 with the guide rollers 32 riding on the upper edge of said rail 18. The elevating frame 28 and rail 31 are lowered to the rest position shown by the dotted lines of FIG. 1, and the animal is rolled directly from the transport rail 18 onto the elevating rail 18a with the back of the animal preferably facing outwardly to the operator.

The arms 39, which are initially in open position as indicated by the dotted lines of FIG. 3 are then closed so as to substantially encircle the body of the animal. It should be noted at this point that because the elevating mechanism 11 and the hide stripping assembly 12 are interconnected with the common hydraulic motor 13 in the manner previously described, they move towards or away from each other simultaneously the same distance of travel, depending on whether the piston of motor 13 is caused move up or down. Thus, when the elevator frame 28 is at its lowest elevation in the rest or stop position of the dotted lines of FIG. 1, the hide stripping assembly is at its highest elevation and assumes the position also shown by dotted lines in FIG. 1 so that the animal is suspended between the arms 39 in initial or starting position with the arms 39 encircling the upper or hind portion of the animal.

After the animal has been properly positioned between the closed arms 39, the operator longitudinally slits the hide on the upwardly extending hind legs to the crotch of the animal, the slits on each leg meeting one another at the crotch to transversely separate or open the upper end of the integrally united generally annular whole hide in much the same fashion as opening the top of a sack, and circumferentially cuts and turns down the uppermost portion of the hide around each leg sufficiently to provide enough hide to be grasped by the grippers. The grippers are then inclined or turned inwardly and the hide is securely grasped between the jaws thereof. If the tensioned grippers of FIGS. 4 and 5 are used, they are then caused to return to the outer or operating position shown by the solid lines of FIGS. 1 and 4 to stretch the hide and take up slack therein. If the grippers of FIG. 7 are employed, they are permitted to rest in an inwardly inclined position, resting either on the animal or suspended from the hide gripped thereby, whichever the case may be.

In some circumstances, it may be preferable to initially circumferentially extending edge to be grasped by the animal in the general plane of the crotch and free a circumferentially extending edge to be grasped by the grippers. In any event, a sufficient amount of hide is freed to be grasped by the grippers and permit the hide to be stripped from the carcass.

When the animal has been properly positioned and the hide initially grasped securely in the jaws of the gripping unit, the piston in the main hydraulic motor B is lowered, causing the hide stripping assembly to move downwardly while simultaneously causing the carcass supporting and elevating mechanism to rise or move upwardly. This action causes the whole generally annular hide to be stripped longitudinally from the animal in much the same fashion as a sweater might be removed by a person in an overhead fashion. The positions of the animal, elevating mechanism and hide stripping assembly shown by the solid lines of FIG. 1 illustrates the relative positions at an intermediate point in the stripping operation. When the elevating mechanism has reached its maximum elevation and the hide stripping assembly has been moved to its lowermost elevation, the animal has been raised substantially clear of the hide stripping assembly and the hide has been neatly removed therefrom. The hide is then removed from the stripping assembly, the arms or yoke members 39 are opened and the elevator is then lowered to the stop position previously described and represented by the dotted lines of FIG. 1. In this position the elevating rail 18a is in alignment with the transport rail 18 and the guide roller 32 is pushed or caused to roll from the elevating rail onto the transport rail and moved farther on down the dressing line to be disposed of as desired, and the hide stripping apparatus is then ready to receive another unstripped carcass.

FIG. 9 illustrates an alternative form of our invention in which the movements of the animal, elevating mechanism and hide stripping assembly are reversed from those previously described, but in which the same result is obtained, namely the longitudinal stripping of the whole hide from the carcass of the animal. In this alternate form, the animal is pulled downwardly during the stripping operation while the hide stripping assembly is pulled upwardly, the hide being initially circumferentially exposed on the lower portion of the trunk of the suspended animal in an area adjacent the head thereof, and the hide is thereupon pulled upwardly from the carcass rather than downwardly as previously described.

To accomplish this alternate form, any suitable means may be employed. An example of such suitable means is illustrated in FIG. 9, in which a horizontal pulley supporting member or members 62 is fixedly mounted on and between the supporting standards 10 a suitable distance beneath the hide stripping assembly 12, the supporting member 62 carrying thereon adjacent each end a pair of pulleys 63. A wire rope or cable 64 is trained around said pulleys with one end thereof being interconnected with the lower connecting rod 16 of the hydraulic motor 13, as by suitable attachment to the rod engaging bracket 46 of the hide stripping assembly. The other end of the cable is connected to the suspended animal as by a head strap or collar 65 securely attached to the head of the animal. The hide stripping operation is as previously described, except that the animal is initially positioned with the arms 39 encircling the lower or fore portion of the suspended animal, as shown, by the relative positions of FIG. 9, and the hide is suitably circumferentially exposed and grasped by the gripping units. The piston of motor 13 is then caused to move upwardly, permitting the suspended animal to be freely lowered. The upward movement of the piston simultaneously pulls the hide stripping assembly upwardly and positively pulls the suspended animal downwardly through the medium of the cable 64, causing the hide to be longitudinally stripped from the carcass.

Thus, in the illustration of FIG. 9 the animal carcass and hide gripping assembly are shown in initial starting position, with the animal carcass being disposed at the upper end of its travel and the hide gripping assembly being disposed at the lower end of its travel. For convenience of illustration, the height of the apparatus has been broken away, so that the lower portion including the pulley supporting member 62 and pulleys 63 appear to be closer to the carcass and hide gripping assembly in initial starting position than they would be in reality, it being obvious that the member 62 and pulleys 63 in actual practice are disposed beneath the carcass and hide gripping assembly in initial starting position a sufficient distance and adjacent the lower end of travel of the animal carcass to permit downward movement or lowering of the carcass a distance or length of travel which will accomplish complete longitudinal stripping or removal of the hide from the carcass, the member 62 being positioned beneath the head of the animal even at its lowest point of travel.

From the foregoing description, the advantages of our invention are readily apparent. By moving the animal in one direction while simultaneously pulling the hide therefrom in an opposite direction, only one-half as much elevation is required for the stripping apparatus as would be otherwise required were the hide to be removed by uni-directional movement only. In addition, it has been found that our hide stripping method and apparatus accomplishes the stripping operation in much less time than has previously been possible by apparatus and methods presently available, and it has also been found that a much neater job of skinning is accomplished by removing the hide longitudinally in this fashion rather than in the old-fashioned way of circumferentially stripping the hide from the animal. The apparatus is readily adaptable to animals of varying weight and size, and the amount of manual labor required on the part of the operator is reduced to a minimum. The hide gripping mechanism provides an extremely strong gripping device which prevents removal or strippage or damage of the hide therefrom. In addition, the apparatus of our invention is adapted to fit neatly into a continuous animal dressing line so that one can be installed in presently available systems with a minimum of modification thereto, and a minimum of expense.

It will, of course, be understood that various changes may be made in the form, details, arrangement and proportions of the various parts without departing from the scope of our invention.

What we claim is:

1. Apparatus for removing hides from animals comprising means for vertically suspending an animal carcass, mechanism for raising and lowering said suspending means, hide gripping means including a pair of yoke members adapted for relative opening and closing movement therebetween for substantially enclosing the suspended animal carcass, said yoke members carrying thereon a plurality of hide gripping units disposed to grasp the hide at circumferentially spaced points around the body of he animal, means for opening and closing said yoke members, and means providing relative vertical movement between the suspending means and the hide gripping means whereby the hide is longitudinally removed from the carcass in tubular fashion.

2. Apparatus for removing hides from animals comprising an elevated horizontal rail having a removable section intermediate the ends thereof, means for vertically suspending an animal carcass adapted for guided movement on said rail and its removable section, elevator means supporting said removable rail section for vertical movement thereof into and out of alignment with the remainder of said rail, yoke members pivotally mounted beneath said removable rail section for opening and closing movement between said members, said members when closed substantially enclosing an animal carcass suspended from said removable rail section, said members when open being disposed away from the path of horizontal movement of said carcass when moved along said rail, means for opening and closing said yoke members, said yoke members having hide gripping units mounted thereon, and means for moving said elevator means and said yoke members in opposite directions whereby the hide is longitudinally stripped from the carcass.

3. The structure of claim 2 wherein a plurality of hide gripping units are carried by said yoke members and are disposed in circumferentially spaced relationship about the animal carcass when the yoke members are closed and effect a substantially uniform circumferential pull on the hide as the hide is being removed from the carcass of the animal whereby the hide is stripped in tubular fashion from the carcass.

4. Apparatus for removing hides from animals comprising hanger means for vertically suspending an animal, elevator means for supporting said hanger means and elevated elevator supporting structure including track means cooperatively engaging said elevator means for guided vertical movement thereon, vertical track means disposed beneath said elevated elevator supporting structure, hide gripping means mounted for guided vertical movement on said vertical track means, and means for moving said elevator means and hide gripping means in opposite directions whereby the hide is longitudinally stripped from the carcass, said hide gripping means including yoke members pivotally mounted to permit converging and diverging movement in a horizontal plane, said yoke members substantially enclosing said suspended animal when in closed position, said yoke members carrying a plurality of hide gripping units pivotally mounted for radial movement relative to said suspended animal and circumferentially spaced around said animal when the yoke members are in closed position to effect a substantially uniform circumferential pull on the hide as it is stripped from the carcass of the animal.

5. The apparatus of claim 4 and tensioning means associated with said gripping units for selectively fixing the position of the gripping units.

6. Apparatus for removing hides from animals comprising hanger means for vertically suspending an animal, elevator means for supporting said hanger means and elevated elevator supporting structure including track means cooperatively engaging said elevator means for guided vertical movement thereon, vertical track means disposed beneath said elevated elevator supporting structure, hide gripping means mounted for guided vertical movement on said vertical track means, and means for moving said elevator means and hide gripping means in opposite directions whereby the hide is longitudinally stripped from the carcass, said means for moving said elevator means and gripping means including a motor having cooperating piston and cylinder members and means interconnecting said piston with said elevator and gripping means in such fashion that movement by said piston in a given direction moves said elevator and gripping means in opposite directions simultaneously.

References Cited in the file of this patent

UNITED STATES PATENTS

| | | |
|---|---|---|
| 2,494,138 | De Moss | Jan. 10, 1950 |
| 2,544,437 | Stow | Mar. 6, 1951 |
| 2,551,155 | Orling | May 1, 1951 |
| 2,654,122 | Derby | Oct. 6, 1953 |
| 2,696,633 | Hincks | Dec. 14, 1954 |
| 2,770,006 | Wilkens | Nov. 13, 1956 |
| 2,897,537 | Schmidt | Aug. 4, 1959 |